(12) United States Patent
Lin et al.

(10) Patent No.: US 11,509,202 B2
(45) Date of Patent: Nov. 22, 2022

(54) VARIABLE FLUX PERMANENT MAGNET MOTOR

(71) Applicant: ABB Schweiz AG, Baden (CH)

(72) Inventors: Chenjie Lin, Fuquay Varina, NC (US); Matthew Henriksen, Raleigh, NC (US); Ghanshyam Shrestha, Cary, NC (US); Elio Alberto Perigo, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 887 days.

(21) Appl. No.: 16/223,971

(22) Filed: Dec. 18, 2018

(65) Prior Publication Data

US 2019/0207492 A1 Jul. 4, 2019

Related U.S. Application Data

(60) Provisional application No. 62/611,149, filed on Dec. 28, 2017.

(51) Int. Cl.
| | |
|---|---|
| *H02K 21/02* | (2006.01) |
| *H02K 21/14* | (2006.01) |
| *H02K 1/276* | (2022.01) |
| *H02K 1/02* | (2006.01) |
| *H02P 31/00* | (2006.01) |
| *H02P 1/00* | (2006.01) |

(52) U.S. Cl.
CPC ............. *H02K 21/028* (2013.01); *H02K 1/02* (2013.01); *H02K 1/276* (2013.01); *H02K 1/2766* (2013.01); *H02K 21/14* (2013.01); *H02P 1/00* (2013.01); *H02P 31/00* (2013.01); *H02K 2213/09* (2013.01)

(58) Field of Classification Search
CPC ....... H02K 21/028; H02K 21/14; H02K 21/46; H02K 1/02; H02K 1/276; H02K 1/2766; H02K 2213/09; H02K 1/223; H02K 21/042; H02P 1/00; H02P 31/00
USPC ............ 310/156.53, 156.56, 156.76, 156.77, 310/156.84, 181–183, 190, 216.095
See application file for complete search history.

(56) References Cited

U.S. PATENT DOCUMENTS

| | | | |
|---|---|---|---|
| 5,200,660 A * | 4/1993 | Heidelberg | H02K 21/029 310/191 |
| 5,760,507 A * | 6/1998 | Miller | H02K 19/24 310/74 |
| 9,054,610 B2 | 6/2015 | Rozman et al. | |
| 2009/0261774 A1* | 10/2009 | Yuuki | H02P 21/10 310/156.01 |
| 2010/0019597 A1* | 1/2010 | Kolehmainen | H02K 1/2766 310/156.56 |

(Continued)

OTHER PUBLICATIONS

Enzo Illiano; Design of a Brushless Separately Excited Synchronous Motor; Brusa; Copyright © Brusa 2004-2010; 23 pgs.

*Primary Examiner* — Michael Andrews
(74) *Attorney, Agent, or Firm* — Leydig, Voit & Mayer, Ltd.

(57) ABSTRACT

A permanent magnet motor is provided that produces variable magnetic flux. The motor may include two different types of permanent magnets with different coercivities. The magnetic state of one of the magnets may be altered during use. In one state, the effective magnetic flux of the motor is greater, and in another state, the effective magnetic flux of the motor is less.

16 Claims, 2 Drawing Sheets

(56) References Cited

U.S. PATENT DOCUMENTS

| | | | | |
|---|---|---|---|---|
| 2011/0175478 A1* | 7/2011 | Sakai | ............... | H02K 1/2766 |
| | | | | 310/156.01 |
| 2011/0304235 A1* | 12/2011 | Hashiba | ............. | H02K 15/03 |
| | | | | 29/598 |
| 2016/0211787 A1* | 7/2016 | Shrestha | ............. | H02K 19/12 |
| 2018/0323664 A1* | 11/2018 | Reddy | ............... | H02P 25/024 |

* cited by examiner

11,509,202 B2

VARIABLE FLUX PERMANENT MAGNET MOTOR

BACKGROUND

The present inventions relate generally to electric motors, and more particularly, to a permanent magnet motor with variable flux.

One type of electric motor is known as a permanent magnet motor. Typically, in a permanent magnet motor, permanent magnets are mounted on or within the rotor of the motor. The permanent magnets are then attracted to and/or repelled by a rotating magnetic field from the stator of the motor to rotate the rotor. Although permanent magnet motors have various advantages over other types of motors, one advantage of permanent magnet motors is their energy efficiency.

Permanent magnet electric motors are used in many different applications. One growing application for permanent magnet electric motors is in the drive systems of automotive vehicles. Efficiency is of particular concern in automotive vehicles since the power supply must be stored on the vehicle and is used up as the vehicle travels. However, permanent magnet electric motors suffer from reduced efficiency when used in automotive vehicles due to the changing speeds and torque of the vehicle during use. Although automotive drive systems are of particular concern, efficiency can be important in many applications.

It is believed by the inventors that a permanent magnet motor with variable flux would improve the efficiency performance of the motor and provide additional advantages to the art of electric motors.

SUMMARY

A permanent magnet motor is described with at least two different states where the effective magnetic flux of the motor is different in each of the two states. The motor may include at least one permanent magnet with a relatively low coercivity that allows magnetization of the magnet to be changed while the motor is in use. Thus, it may be possible to provide a motor that produces more effective magnetic flux at a low motor speed and less effective magnetic flux at a higher motor speed.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
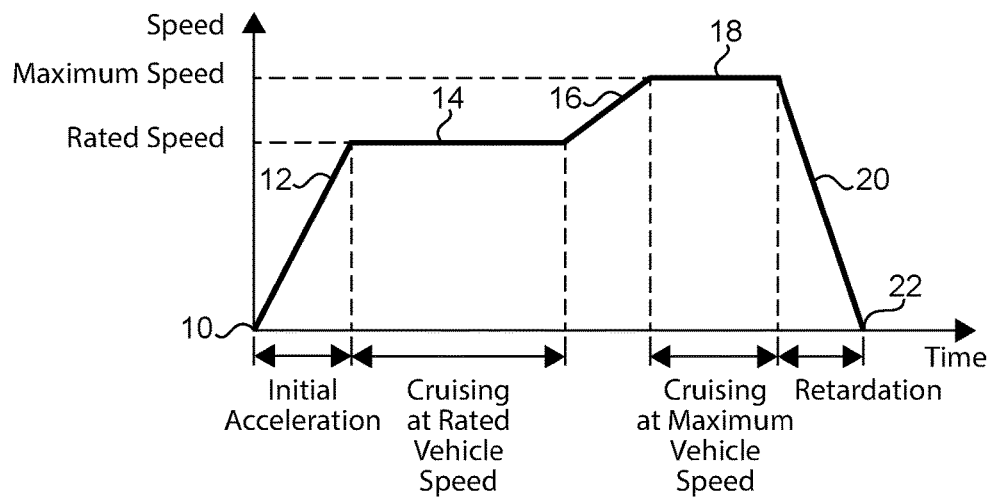
FIG. 1 is a chart showing automotive vehicle speed.

Referring now to the figures, and particularly FIG. 1, a chart showing typical stages of automotive vehicle travel. As shown, a vehicle begins from a stopped position with zero travel speed 10. When the driver decides to start traveling, the vehicle changes speed 12 from zero to a faster rated speed 14. Although the chart in FIG. 1 shows the acceleration 12 to rated speed 14 as being constant, this is a vast simplification of the changes in speed that a vehicle experiences, since actual speed changes depend on many factors including individual driver preferences, road conditions, etc. As shown in FIG. 1, it is common for the vehicle to reach a particular speed 14 that remains generally constant over a period of time. Subsequently, the vehicle may change speed again 16, for example, by speeding up. Although vehicles are rarely operated at their maximum speed, the design of the vehicle does include a maximum expected speed 18 of the vehicle, and it is possible that the vehicle will be operated at the design maximum 18 for a period of time or merely a maximum speed 18 for a particular trip. In any event, when the driver decides to end the trip or intermittently stop, the vehicle decelerates 20 back to a stop at zero speed 22.

Figure 2:
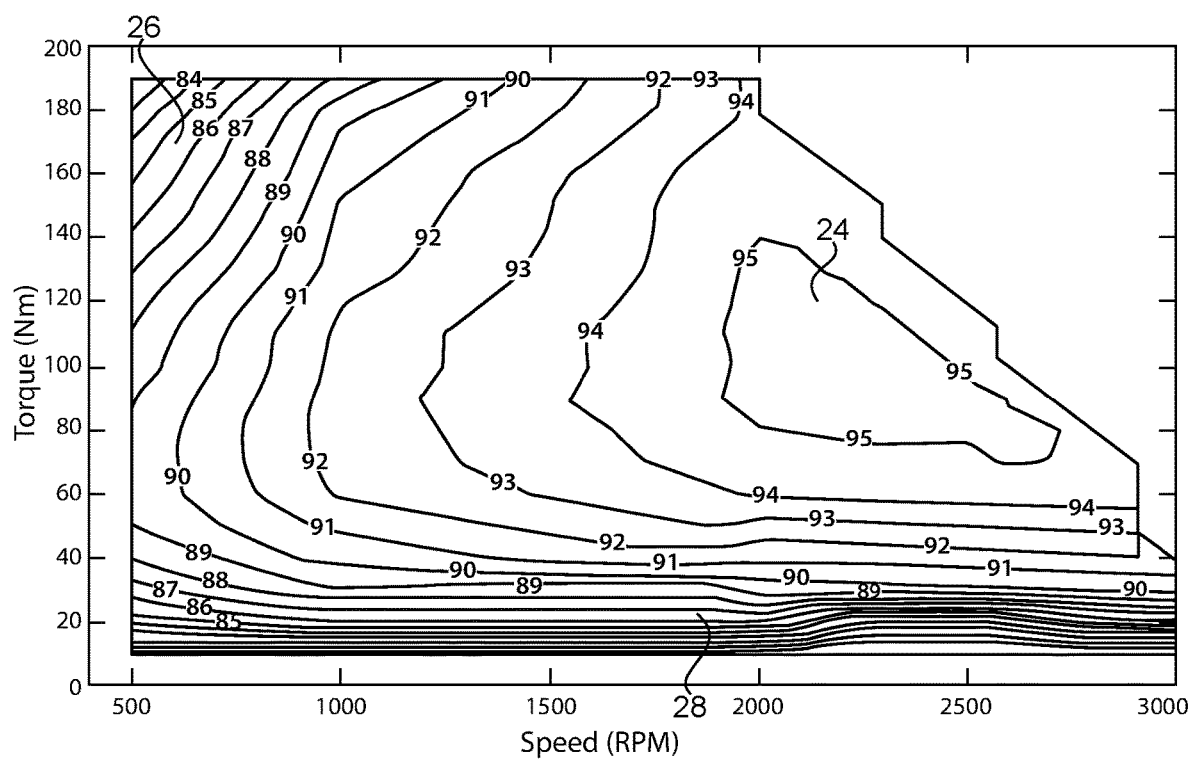
FIG. 2 is a chart showing a motor efficiency map.

Turning to FIG. 2, one problem with using permanent magnet motors in the drive system of automotive vehicles is the varying efficiency of the motor as the torque and speed of the vehicle changes. While this may not be as significant a problem in other applications, it is particularly notable with respect automotive vehicles because of the wide range of speed and torque changes and high importance of efficiency. FIG. 2 illustrates a typical efficiency map of a conventional permanent magnet motor in an automotive vehicle. As shown, the peak efficiency of about 95% is reached at a torque between 80 and 140 Nm and a speed between 2,000 and 2,500 rpm. As shown, however, efficiency of the motor decreases outside of this range. For example, at high torque and low speed (e.g., initial acceleration) 26, the efficiency of the motor is notably less than the highest efficiency region 24. The motor also has lower efficiency at low torque levels 28 throughout the entire speed range.

Figure 3:
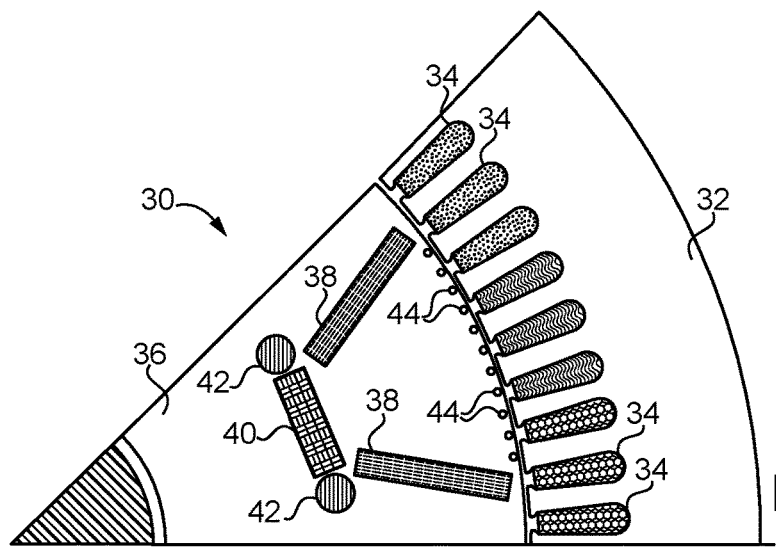
FIG. 3 is a cross-section of a portion of an electric motor.

An improved permanent magnet motor 30 is shown FIG. 3. As shown, the motor 30 has a stator 32 with stator coils 34 to generate a rotating magnetic field. As in a conventional electric motor, the stator 32 typically does not rotate. A rotor 36 is mounted within the stator 32, although it is understood that other rotor arrangements are possible where the rotor is on the outside of stator. A series of permanent magnets 38, 40 are mounted within the rotor 36. Although it may be possible in some designs to place the permanent magnets 38, 40 in the stator 32, the most common arrangement involves placing the permanent magnets 38, 40 in the rotor 36. The permanent magnets 38, 40 may include at least two different types of permanent magnets 38, 40. Alternatively, the magnets 38, 40 may be the same type if desired.

The permanent magnets 38, 40 may be defined by the intrinsic coercivities. As is known, coercivity is a measure of the ease with which a material can be magnetized and/or demagnetized. That is, materials with a higher coercivity are more difficult to magnetize and/or demagnetize, whereas materials with a lower coercivity are easier to magnetize and/or demagnetize. It is understood that magnetization as described herein refers to an event that causes the material to remain magnetized after the event occurs, and demagnetization refers to an event that causes the material to be non-magnetized or at least less magnetized after the event. Typically, magnetic materials are magnetized in manufacturing, for example, by applying a strong magnetic field to the material, such that the material remains magnetized after the magnetizing field has been removed. A magnetized material may also be demagnetized in a similar manner, such as by applying a strong magnetic field to the material in an opposite direction compared to the initial magnetic field, or by a change in temperature when the magnetized material reaches its respective Curie temperature. Thus, permanent magnets are understood to mean that a magnet continues to hold a magnetic field between magnetizing and demagnetizing events. Where a magnetic field is used to magnetize and/or demagnetize material, it is understood that a material with a high coercivity requires a stronger magnetic field to be demagnetized than a material with a lower coercivity.

In the embodiment of FIG. 3, the first permanent magnets 38 have a higher coercivity than the second permanent magnet 40. In particular, the first magnets 38 preferably have a coercivity high enough that the first magnets 38 cannot be demagnetized during ordinary use of the motor 30. On the other hand, the second magnet 40 preferably has a lower coercivity than the first magnets 38, and as described below, can be magnetized and/or demagnetized during ordinary use of the motor 30. Although there are various materials that may be used for the first and second magnets 38, 40, the first magnets 38 may be made of NdFeB, and the second magnet 40 may be made of AlNiCo. The coercivity of the first magnets 38 may be represented as a minimum coercivity since it is preferable for the first magnets 38 to not be magnetized and/or demagnetized during use. Thus, the first magnets 38 preferably have a coercivity of more than 6 kOe, or more than 10 kOe. By contrast, the second magnet 40 preferably has a coercivity that requires a moderate magnetic field to be magnetized and/or demagnetized during use of the motor 30. Thus, the second magnet 40 preferably has a coercivity between 0.1 and 5.0 kOe, or between 0.5 and 2.5 kOe.

As also shown in FIG. 3, a magnetic field generator 42 is provided next to the second magnet 40. During use, the magnetic field generator 42 produces a magnetic field of sufficient strength to magnetize and/or demagnetize the second magnet 40. Thus, the magnetic field generator 42 alters the magnetization of the second magnet 40 between multiple states. As shown, the magnetic field generator 42 may be a magnetic coil 42 that extends axially through the rotor 36 and wraps around the second magnet 40. Thus, as shown, one side of the coil 42 extends along one side of the second magnet 40 and adjacent one of the first magnets 38, and other side of the coil 42 extends along the other side of the second magnet 40 and adjacent the other first magnet 38.

A harvesting coil 44 may also be provided. The harvesting coil 44 is preferably disposed along the outer surface of the rotor 36 next to the air gap between the rotor 36 and the stator 32. In use, a current is induced in the harvesting coil 44 by the magnetic flux between the rotor 36 and the stator 32. The current from the harvesting coil 44 is supplied to the magnetization coil 42 to magnetize and/or demagnetize the second magnet 40. Typically, a converter and/or controller is provided between the harvesting coil 44 and the magnetization coil 42. Preferably, a controller is also used to switch the current flow to the magnetization coil 42 on and off as desired during use of the motor 30.

Figure 4:
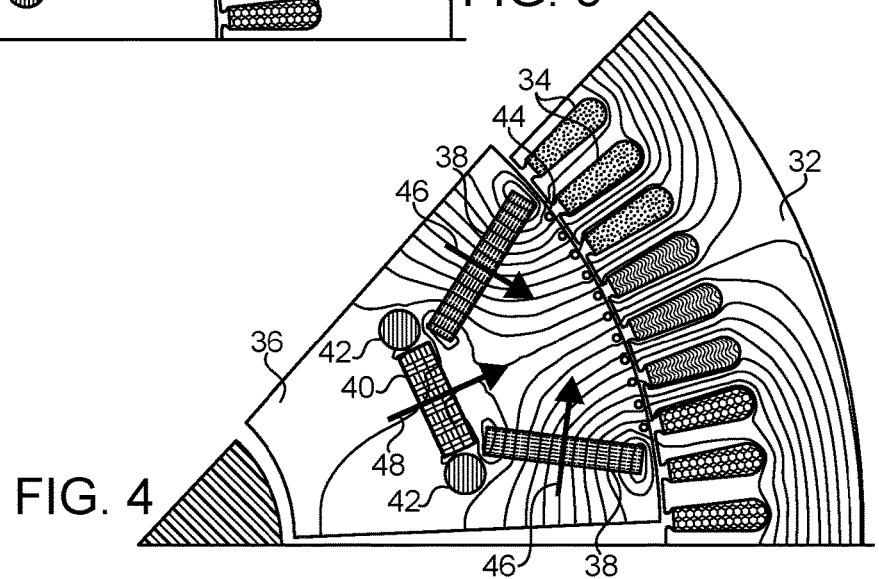
FIG. 4 is a cross-section of a portion of the electric motor, showing magnetic flux of the magnets.
Figure 5:
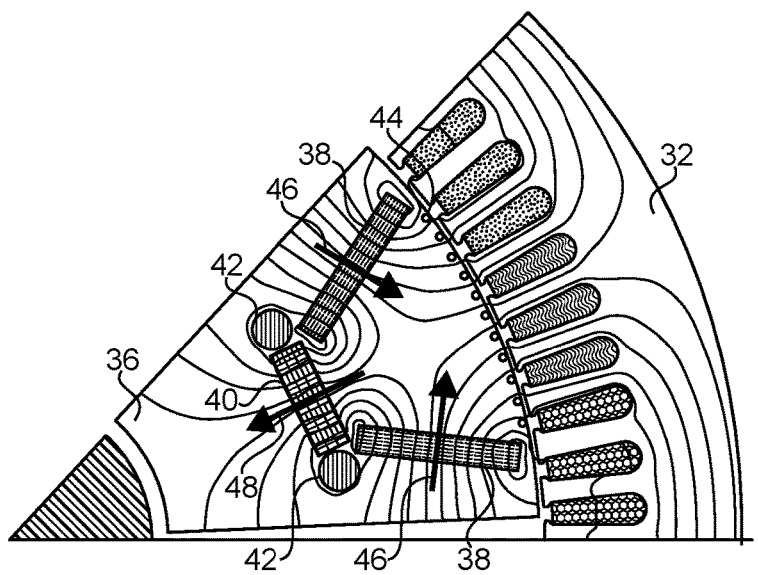
FIG. 5 is a cross-section of a portion of the electric motor, showing the magnetic flux of the second magnet opposed to the magnetic fluxes of the first magnets.

The motor 30 is shown with magnetic flux lines in FIGS. 4 and 5 to illustrate how the second magnet 40 can be used to vary the magnetic flux of the rotor 36. FIG. 4 illustrates one state of the second magnet 40 where the second magnet 40 is either demagnetized or magnetized such that the polarity of the second magnet 40 matches the polarity of the first magnets 38. That is, the magnetic flux 48 of the second magnet 40 does not interfere with the magnetic flux 46 of the first magnets 38 and can be used to reinforce the magnetic flux 46 of the first magnets 38. Thus, the magnetic flux of the rotor 36 is greater in this state.

By contrast, in FIG. 5, the polarity of the second magnet 40 is opposed to the polarity of the first magnets 38. As a result, the magnetic flux 48 of the second magnet 40 retards the magnetic flux 46 of the first magnets 38. That is, a portion of the magnetic flux 46 of the first magnets 38 is drawn inward away from the stator 32 toward the center of the rotor 36. Thus, the magnetic flux of the rotor 36 is less in this state.

The control of the second magnet 40 may be adjusted as desired, such that the magnetic flux 48 of the second magnet 40 superposes the magnetic flux 46 of the first magnets 38 in at least one state to reinforce or retard the magnetic flux 46 of the first magnets 38. For example, where it is desired to have opposing polarities for the second magnet 40 in two different states, the controller may reverse the direction of the current in the magnetization coil 42 in order to remagnetize the second magnet 40 with an opposite polarity. Two different states of the second magnet 40 may also be achieved by demagnetizing the second magnet 40 in one state, magnetizing the second magnet 40 in the second state with either a matching or opposite polarity to the first magnets 38. It may also be possible for two different states to involve magnetization of the second magnet 40 with the same polarity but with different magnitudes of magnetization. Further, it may be possible to have three or more states for the second magnet 40 with different polarities and/or different degrees of magnetization.

The first and second magnets 38, 40 may be arranged as desired to permit the magnetic flux 48 of the second magnet 40 to influence the magnetic flux 46 of the first magnets 38. Although FIG. 3 illustrates the rotor 36 with two first magnets 38 and one second magnet 40 for each pole in the rotor 36 (in an eight pole motor), it is understood that the number of first and second magnets 38, 40 and arrangement thereof may be varied as desired. Nevertheless, in a preferred embodiment, two first magnets 38 are provided in an angular orientation with respect to each other. As shown, the lateral surfaces of the first magnets 38 are polarized and facing at least partially toward each other and toward the stator 32. That is, the magnetic flux of the first magnets 38 are directed toward the stator 32 with the polarities of the two first magnets 38 matching each other. The second magnet 40 is preferably centrally located between the two first magnets 38 and may be located radially inward from the first magnets 38. Thus, as shown in FIG. 5, the second magnet 40 is positioned to draw a magnetic flux 46 from the inner ends of the first magnets 38 away from the stator 32 and inward toward the center of the rotor 36. Like the first magnets 38, the lateral surfaces of the second magnet 40 are preferably polarized such that the outer lateral surface facing the stator 32 may have a polarity matching the polarities of the outward facing lateral surfaces of the first magnets 38 or an opposing polarity thereto.

The variable flux permanent magnet motor 30 may be especially useful in variable speed applications, such as automobile drive systems. As noted, the speed and torque of automotive drive systems can vary extensively during use. However, conventional permanent magnet motors have a narrower range of speeds where the motor operates at the highest level of efficiency. This is due at least in part to the constant magnetic flux of the permanent magnets used in a permanent magnet motor. However, the magnetic flux of the permanent magnets is typically chosen based on the most common expected speed of the motor but cannot be optimized for every possible speed of the motor. That is, under certain motor drive systems, when the motor rotates at a higher speed, a lower amount of magnetic flux from the rotor may result in greater power efficiency. Conversely, when the motor rotates at a lower speed, greater power efficiency may be achieved with a higher amount of magnetic flux from the rotor. And yet, this level of optimization is not possible with conventional permanent magnet motors since the magnetic flux of the rotor is the same at all speeds. Thus, a preferred use for the described motor 30 involves adjusting the effective magnetic flux of the first and second magnets 38, 40 at different speed ranges. For example, the second magnet 40 may be used to generate a higher rotor flux at lower speed ranges where higher flux improves efficiency. The magnetization of the second magnet 40 may then be changed so that the effective rotor flux is less at a higher speed to improve efficiency at higher speeds. While it may be possible in some applications for the motor 30 to be stopped and the magnetization of the second magnet 40 to be adjusted when the motor 30 is stopped, it is more preferable for the adjustment to be done while the motor 30 is running during speed changes between lower and higher speeds.

While the described motor 30 may be useful in improving power efficiency in permanent magnet motors, the described motor 30 may also make it possible to provide a motor with a greater total speed range than typical of current motors. However, there may be other uses for the described motor 30 as well. For example, it may be desirable to use the altered magnetization states of the second magnet 40 as a shutdown mechanism in a permanent magnet motor. In a typical permanent magnet motor, when the stator flux stops rotating (e.g., in a short-circuit fault), the permanent magnets align with the non-rotating stator flux and resist further rotation. This may be undesirable in applications like automotive drive systems where a sudden stop in drive speed would be problematic, and thus, other safety mechanisms like release clutches may be needed. However, the described motor 30 could be configured to substantially deactivate the rotor flux in certain conditions to allow the rotor 36 to more freely rotate even with a non-rotating stator flux. Another possible application could involve the assembly of large motors where it can be difficult to insert a rotor with strong permanent magnets into the stator, since the magnets will tend to pull the rotor from side-to-side during assembly. However, the described arrangement could be used to reduce the rotor flux during assembly and then restore full rotor flux after the motor has been assembled to make assembly easier or enable the assembly of previously unassemblable motors and generators.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A variable flux electric motor, comprising:
a first permanent magnet producing a first magnetic flux;
a second permanent magnet producing a second magnetic flux; and
a magnetic field generator configured to alter magnetization of the second permanent magnet between at least first and second states and wherein the magnetic field generator alters the magnetization of the second permanent magnet between two speed ranges of the variable flux electric motor such that an effective flux of the first and second permanent magnets is greater at a lower speed range and less at a higher speed range;
wherein the second magnetic flux superposes the first magnetic flux in at least the first state to reinforce or retard the first magnetic flux greater than in the second state, and
wherein the first permanent magnet, second permanent magnet and magnetic field generator are disposed within a rotor of the variable flux electric motor, the magnetic field generator comprises a magnetization coil disposed around the second permanent magnet, and further comprising a harvesting coil, current being generated within the harvesting coil from magnetic flux between the rotor and a stator of the variable flux electric motor, the current being supplied to the magnetization coil.

2. The variable flux electric motor according to claim 1, further comprising a harvesting coil, current being generated within the harvesting coil from magnetic flux between a rotor and stator of the variable flux electric motor, the current being supplied to the magnetization coil.

3. The variable flux electric motor according to claim 2, further comprising a converter and/or controller between the harvesting coil and the magnetization coil.

4. The variable flux electric motor according to claim 1, wherein the intrinsic coercivity of the second permanent magnet is between 0.1 and 5.0 kOe.

5. The variable flux electric motor according to claim 1, wherein the intrinsic coercivity of the second permanent magnet is between 0.5 and 2.5 kOe.

6. The variable flux electric motor according to claim 1, wherein the first permanent magnet, second permanent magnet and magnetic field generator are disposed within a rotor of the variable flux electric motor.

7. The variable flux electric motor according to claim 1, further comprising two first permanent magnets with lateral surfaces thereof facing at least partially toward each other, the lateral surfaces having matching magnetic polarities.

8. The variable flux electric motor according to claim 7, wherein the second permanent magnet comprises a lateral surface thereof facing at least partially in the direction of the lateral surfaces of the first permanent magnets.

9. The variable flux electric motor according to claim 8, wherein the lateral surfaces of the first permanent magnets have opposing magnetic polarities to the lateral surface of the second permanent magnet in at least one of the states.

10. The variable flux electric motor according to claim 8, wherein the first and second permanent magnets are disposed within a rotor of the variable flux electric motor.

11. The variable flux electric motor according to claim 10, wherein the lateral surfaces of the first permanent magnets at least partially face the stator of the variable flux electric motor, and the second permanent magnet being disposed at least partially between the first permanent magnets and radially inward form the first permanent magnets.

12. The variable flux electric motor according to claim 1, wherein the magnetic field generator reverses the polarity of the second magnetic flux between the first and second states, the second magnetic flux reinforcing the first magnetic flux in the first state and retarding the first magnetic flux in the second state.

13. The variable flux electric motor according to claim 1, wherein the intrinsic coercivity of the first permanent magnet is greater than 6 kOe.

14. The variable flux electric motor according to claim 1, wherein the intrinsic coercivity of the first permanent magnet is greater than 10 kOe.

15. The variable flux electric motor according to claim 1, wherein the magnetic field generator alters the magnetization of the second permanent magnet between two speed ranges of the variable flux electric motor such that an effective magnetic flux of the first and second permanent magnets is greater at a lower speed range and less at a higher speed range.

16. The variable flux electric motor according to claim 1, wherein the magnetization coil extends axially.

* * * * *